Aug. 14, 1951 A. SCHLANG 2,563,964

PHASE MODULATOR

Filed May 21, 1949 5 Sheets-Sheet 1

INVENTOR.
ARTHUR SCHLANG
BY
Darby & Darby
ATTORNEYS

INVENTOR.
ARTHUR SCHLANG
BY
Darby & Darby
ATTORNEYS

INVENTOR.
ARTHUR SCHLANG
BY
Darby & Darby
ATTORNEYS

INVENTOR.
ARTHUR SCHLANG
BY
Darby + Darby
ATTORNEYS

Aug. 14, 1951 A. SCHLANG 2,563,964

PHASE MODULATOR

Filed May 21, 1949 5 Sheets-Sheet 5

INVENTOR.
ARTHUR SCHLANG
BY
Darby & Darby
ATTORNEYS

Patented Aug. 14, 1951 2,563,964

UNITED STATES PATENT OFFICE 2,563,964

PHASE MODULATOR

Arthur Schlang, Brooklyn, N. Y.

Application May 21, 1949, Serial No. 94,694

8 Claims. (Cl. 332—23)

The present invention is directed toward improvements in modulation systems for modulating a carrier wave by a modulation signal, and is especially applicable to systems for phase modulation such as are used in phase and/or frequency modulation communication.

In systems of this type it is highly desirable that the phase of the carrier wave be varied about a center value over a wide range and substantially linearly proportional to the amplitude of the modulation signal. According to the present invention such substantially linear modulation can be obtained over a wider range of phase swing than has heretofore been practicably available.

The present invention provides a phase modulator system in which a special network is utilized for producing wide-swing phase modulation in a linear fashion. An important part of the apparatus is the provision of special means in association with the network for obtaining the desired phase modulated output. According to the present invention, the network is provided by four branches, two of which are identical in impedance and the other two of which are formed by a substantially pure resistance and pure reactance. Either the resistance or the reactance, or both, are made variable in correspondence with the modulation signal to produce a correspondingly varying modulated output from the network. Special output circuits are utilized to derive the modulated output from the network.

Further objects and advantages of the present invention will become apparent from consideration of the following detailed description of preferred embodiments of the invention, taken in conjunction with the appended drawings, wherein.

Figure 1:
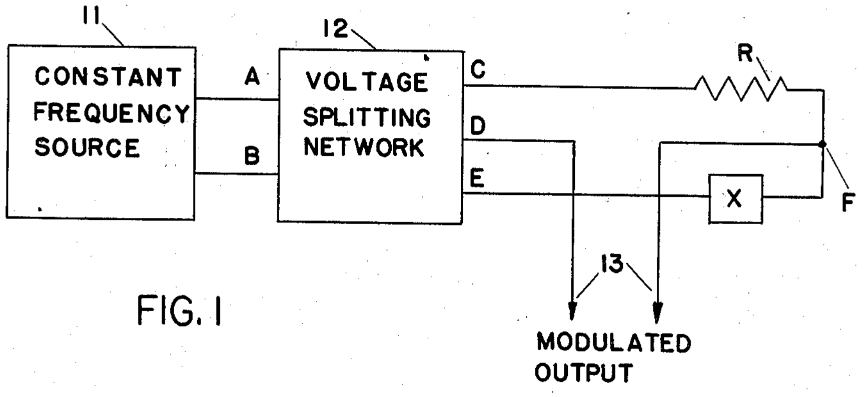
Figure 1 shows a schematic block circuit diagram useful in explaining the principles of the present invention.

Referring to the drawings, Figure 1 shows a block circuit diagram comprising a constant frequency carrier source 11 which supplies a constant frequency wave to a voltage splitting network 12 having input terminals *a*—*b*. Network 12 has three output terminals *c*, *d*, *e*. and is adapted to produce identically equal voltages between the terminals *c*—*d* and the terminals *d*—*e*.

Figure 2:
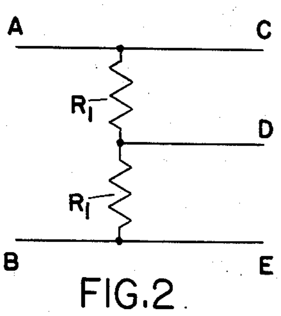
Figures 2, 3 and 4 show circuit diagrams of alternate forms of the voltage supply network of Figure 1.
Figure 3:
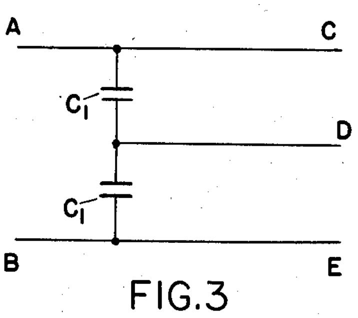
Figure 4:
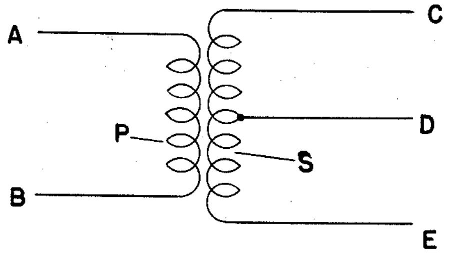

Figures 2, 3 and 4 illustrate some of the forms which this voltage splitting network 12 may take. Thus, as in Figure 2, the network may merely comprise series-connected identical resistors $R_1$ whose outer terminals are respectively connected to *a*, *c* and *b*, *e*, and whose junction is connected to terminal *d*. Figure 3 shows a similar arrangement in which identical condensers $C_1$ have replaced the resistors $R_1$. It will be understood that in place of the condensers $C_1$ or resistors $R_1$ any identical impedance elements may be utilized whereby the voltage between terminals *c* and *d* is identical both in amplitude and phase with the voltage between terminals *d* and *e*. However, neither of these two output voltages need bear any particular relationship to the input voltage at terminals *a*—*b*, either in amplitude or in phase.

Figure 4 shows another form of voltage splitting network comprising a transformer having a primary winding P and center-tapped secondary winding S, the input terminals *a* and *b* being connected to the primary winding P, and the output terminals *c*, *d* and *e* being connected to the output terminals and center-tap of secondary S, respectively.

Connected between terminals *c* and *e* in Figure 1 is a resistor R in series with a reactance X. As will be discussed hereinbelow, the reactance X may take any desired form so long as the resistance component thereof is negligible. The modulated output from the circuit is derived from the terminals *d* and *f* connected to output leads 13.

Figure 5:
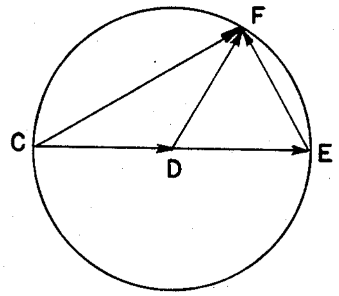
Figure 5 is a vector diagram useful in explaining the principles of operation of the invention.

The operation of this circuit will be readily understood from a consideration of the vector diagram of Figure 5. The vector *c*—*d* represents the voltage between terminals *c* and *d*. Likewise the vector *d*—*e* represents the voltage between terminals *d* and *e*. Since the voltage between *c* and *e* is impressed across the series circuit R and X, it will be apparent that the voltage *c*—*e* must equal the algebraic sum of the voltages *c*—*f* and *f*—*e*. However, these latter two voltages are necessarily in phase quadrature since the same current flows through both the resistor R and the reactance X. Hence the locus of all possible potentials of point *f* in response to variation in either R or X or both, must be a circle with center at $d$ and diameter $c$—$e$. The output voltage is obtained from the terminals $d$—$f$ of Figure 1 and is hence represented by the vector $d$—$f$ of Figure 5. This vector is the constant radius of the circle just mentioned, which shows that the output voltage is of uniform amplitude and is merely varied in phase upon variation of the resistance R or reactance X.

The resistance R can readily be varied by forming it as the resistance of a pentode tube which, as is well known, is variable in accordance with the potentials applied to its electrodes. One or more of these potentials may then be varied in correspondence with the modulation signal to produce the desired phase modulated output having negligible amplitude modulation. Similarly the reactance X may be formed as a well known reactance tube modulator producing an effective reactance varying in correspondence with the modulation signal applied to the reactance tube modulator. If desired, both R and X may be varied by the modulation signal.

Figure 6:
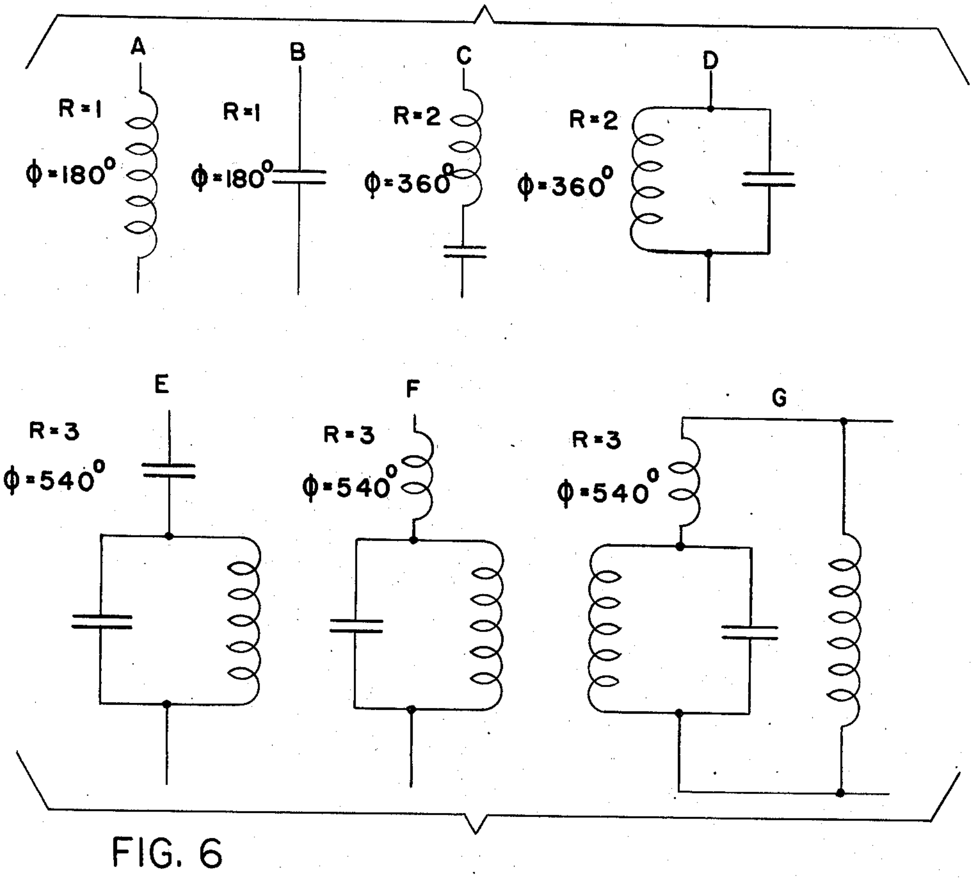
Figure 6 shows various forms of reactance suitable for use with the present invention.

Figure 6 illustrates some of the various forms which the reactance X may assume according to the present invention. It will be seen that it may be a simple variable inductance, as at A, or a simple variable capacitance as at B. However, in each of these instances the maximum phase variation possible is 180 degrees, of which only a small portion is linear enough with respect to the modulation signal variations for practical use. The maximum phase shift possible with a circuit such as in Figure 1 may be represented by the equation $\phi = r \times 180°$ where $r$ is the number of reactive sign changes appearing between the terminals $f$ and $e$. In Figures 6A and 6B, $r$ equals 1; Figures 6C and 6D show two circuits in which $r$ equals 2, producing a total maximum phase shift of 360°. Figures 6E, F and G show further reactance networks where $r$ equals 3, producing a maximum phase shift of 540°. It will then be seen that for more complicated networks a greater total phase shift can be obtained. However the quantity $r$ does not necessarily equal the number of circuit components in each configuration.

Figure 7:
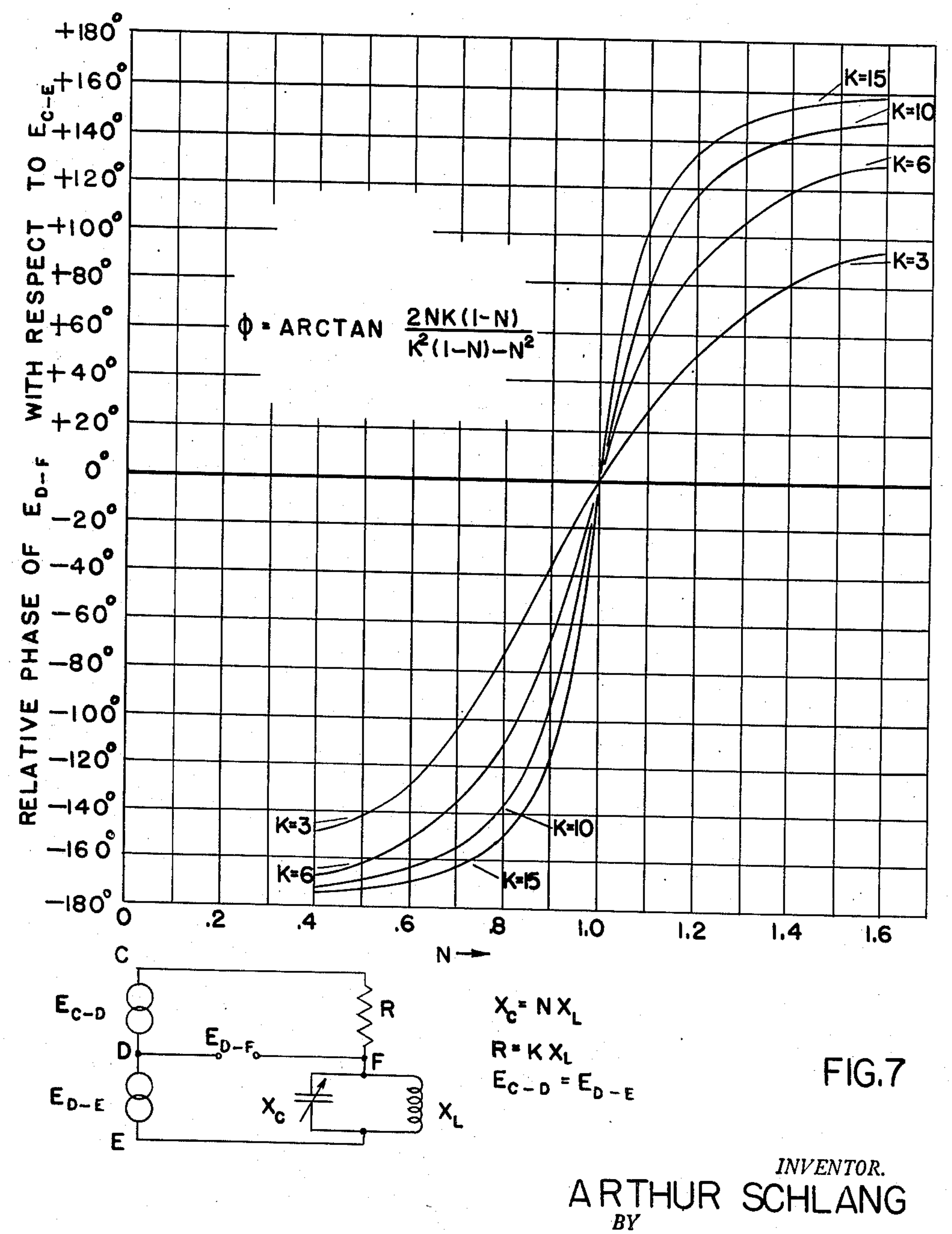
Figure 7 is a graph of various curves illustrating the characteristics of the present invention.

In choosing a particular configuration for use in the system of Figure 1, the desired extent of linear phase deviation must be balanced against the increasing complexity of the network. Configurations of the type of Figures 6C and 6D have been found to be extremely useful since they produce linear useful phase deviations on the order of plus or minus 120 degrees from a center value. This is shown in the curve of Figure 7, illustrating a family of curves of relative phase of the output voltage with respect to the input voltage plotted against the quantity $n$ which represents the ratio of the variable capacitive reactance of the capacitance C of the configuration of Figure 6D in relation to the inductive reactance of the fixed inductance L of that configuration. It will be understood that $n$ is variable in correspondence with the modulation signal.

The various curves of Figure 7 are plotted for various values of a parameter $k$, which represents the ratio of the resistance R to the reactance of the inductive element L of Figure 6D. It will be seen that as $k$ increases, which means that the resistance R increases relative to XL, the curves get steeper and steeper and are linear for a greater portion of their length. However, there is a practical limit to the increase of $k$ (or increase of resistance R), since if the resistance R were to become commensurable with the magnitude of the stray capacitive reactance of the resistor R, the impedance between points $c$ and $f$ of Figure 1 would no longer be essentially resistive and amplitude modulation of the output would result. Conversely, if the inductance L of Figure 6D were made too small (which would also increase $k$) its Q would drop to such a low value that it would cause the reactive network X to assume a substantially resistive component which would also cause spurious amplitude modulation as well as reduced phase deviation. Furthermore, if $k$ is too large, instability occurs because of the increasing slope of the curves of Figure 7, whereby any slight drift in the frequency of the circuit would have a tendency to cause the apparatus to pass into an inoperative region of its characteristic curves. A compromise value of $k$ equals 15 has been found to be satisfactory.

Figure 8:
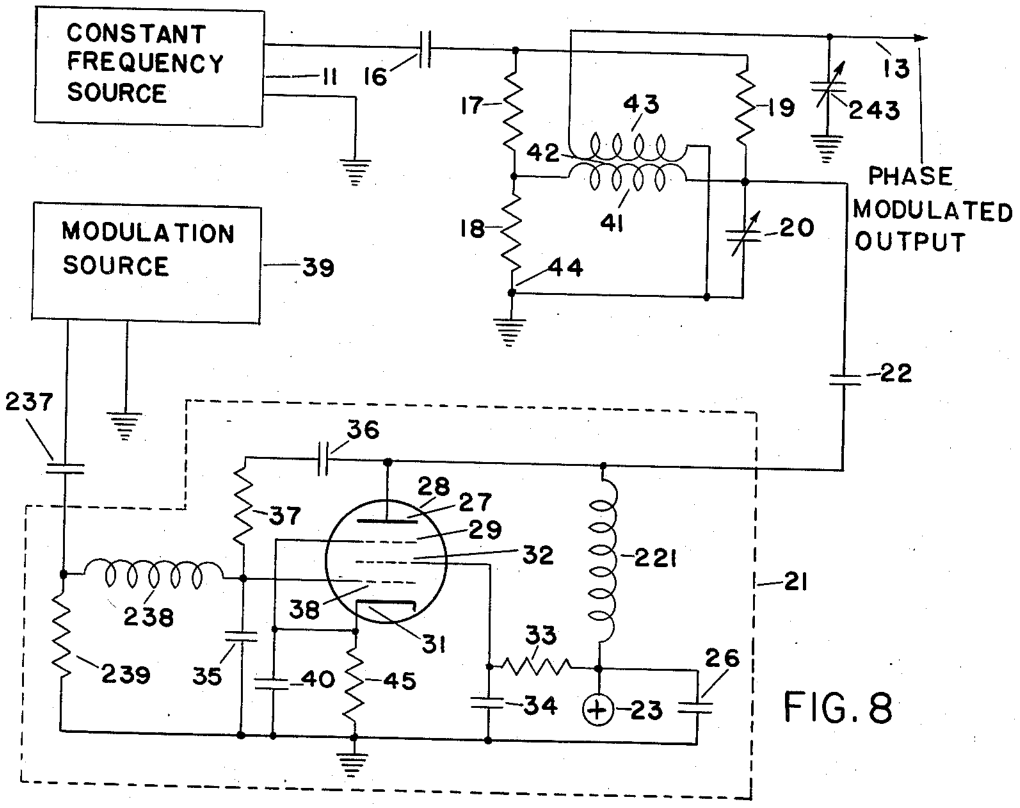
Figures 8, 9 and 10 are complete circuit diagrams of different embodiments of the invention, Figure 9A being a modification of a portion of Figure 9.
Figure 9:
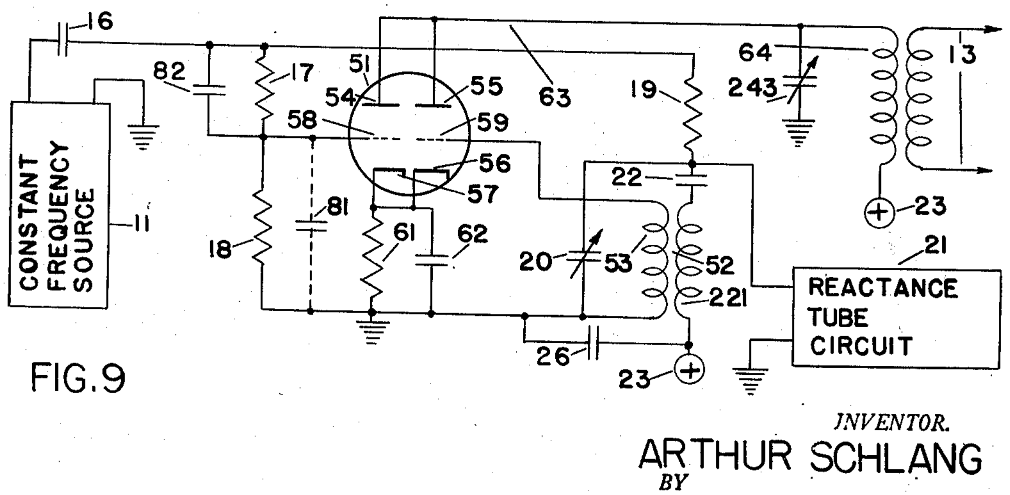
Figure 10:
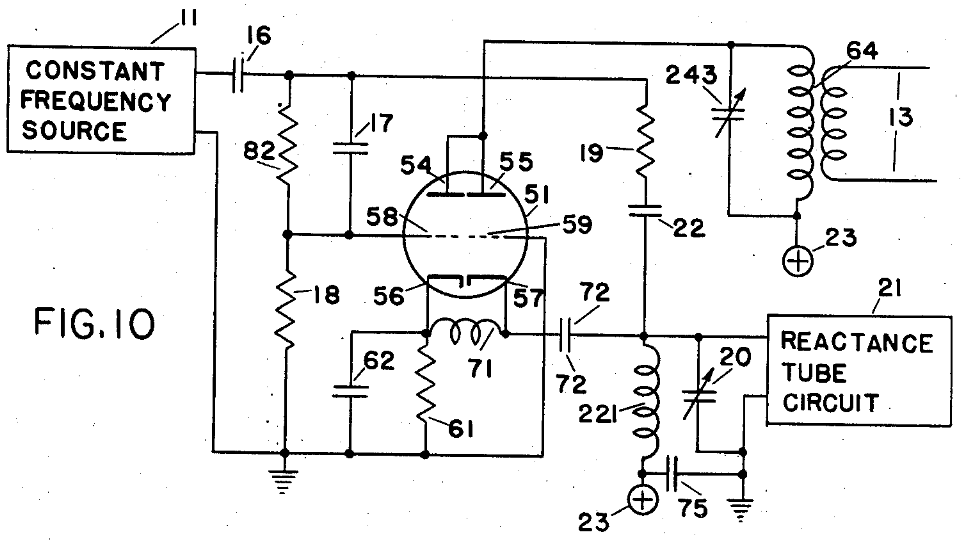

Figures 8, 9 and 10 show complete schematic circuit diagrams of several forms of the invention, using the reactance configuration of Figure 6D with fixed capacitance and variable inductance. In this case R was chosen to have a value 15 times the capacitive reactance of the condenser of Figure 6D.

Referring to Figure 8, the carrier source 11 is coupled through a coupling and blocking condenser 16 to the two identical resistors 17 and 18 corresponding to the resistors R1 of Figure 2. In parallel with these resistors 17, 18 is the series connection of a resistor 19 and a condenser 20 corresponding respectively to the resistor R of Figure 1 and the condenser C of Figure 6D. In parallel with the condenser 20 is a reactance tube modulator circuit 21 providing the element L of Figure 6D. This reactance tube modulator circuit comprises an inductance 21 coupled through a low reactance coupling and blocking condenser 22 to the junction between resistor 19 and condenser 20. The other terminal of inductance 21 is connected to the source 23 of positive plate supply voltage which is by-passed to ground at 24 with respect to alternating currents by means of condenser 26.

The junction between inductance 21 and condenser 22 is connected directly to the anode 27 of the reactance tube 28 which has a suppressor grid 29 connected directly to its cathode 31 and a screen grid 32 connected through a voltage dropping resistor 33 to the potential source 23. Screen grid 32 is also by-passed to ground 24 for alternating currents by condenser 34. Cathode 31 is connected to ground through bias resistor 45 shunted by by-pass condenser 40. The anode 27 is coupled through a condenser 36 and resistor 37 to the control grid 38 of tube 28 which is connected to ground through a condenser 35 across which appears the feedback voltage from anode 27 to grid 38. This feedback causes the tube 28 and its circuit to act as a variable inductance, depending upon the potential applied to its control grid 38.

Control grid 38 is connected to the modulation signal source 39 through a radio frequency choke 238 and coupling condenser 237, a grid leak resistor 239 being connected between the junction of choke 238 and condenser 237, and ground. The control grid 38 thereby has its potential varied in correspondence with the variation in the modulation signal, whereby, in well known manner, the effective inductance of the circuit 21 similarly varies in correspondence with the modulation signal. As discussed relative to Figure 1, output is derived from between the junction of resistors 17, 18 and the junction of resistor 19 and the parallel tuned circuit formed by condenser 20 and the variable inductance of circuit 21. This is done by connecting between these two junctions the primary 41 of a transformer 42 whose secondary 43 has one terminal grounded at 44 and the other terminal connected to the output circuit at 13. Condenser 243 is coupled across and resonates with transformer secondary 43, to provide a high impedance load on the bridge circuit 17, 18, 19, 20.

With no modulation signal potential applied to control grid 38, condenser 20 is adjusted until the parallel circuit formed by condenser 20 and the effective inductance of the reactance tube modulator circuit 21 is resonant to the frequency of the carrier produced by source 11. Thereupon any modulation signal derived from source 39 and impressed upon the control grid of tube 28 correspondingly varies the inductance of that resonant circuit 20, 21 which varies its reactance, and thereby varies the phase of the carrier frequency voltage induced in the secondary 43 of transformer 42 to produce the desired phase modulated output as described above. By use of the present circuit it has been found that substantially linear phase deviations of the order of plus or minus 120 degrees have been produced.

It will be understood that the output derived from lead 13 may be coupled in any desired manner, as by radiation or conduction, to a receiver, or may be frequency multiplied to produce a larger deviation in accordance with well known techniques. Where a frequency modulated output is desired pre-emphasis of the modulation signal may be utilized in accordance with well known techniques to produce a frequency modulated output from secondary 43 rather than a phase modulated output.

In one representative circuit the following circuit values were found to be desirable:

Condenser 16, 100 micromicrofarads
Resistor 17, 10,000 ohms
Resistor 18, 10,000 ohms
Resistor 19, 12,000 ohms
Condenser 20, 30 micromicrofarads
Condenser 22, .001 microfarad
Inductance 21, 20 microhenries
Condensers 26 and 34, .001 microfarad
Resistor 33, 75,000 ohms
Condenser 36, .001 microfarad
Resistor 37, 10,000 ohms
Condenser 35, 20 micromicrofarads
Condenser 40, 20 microfarad (electrolytic) shunted by .001 microfarad
Tube 28 was of the type 6AU6

Figure 9 shows a more practical and more desirable form of the invention in which the transformer 42 has been replaced by a vacuum tube combining circuit in the form of a double triode tube 51. The circuit here is substantially the same as in Figure 8, except that the transformer 42 has been omitted and the inductance 21 now forms the primary of a transformer 52 having a secondary 53. Transformer 52 is solely for the purpose of reversing the phase of the voltage across inductance 21, and has no voltage step-up or step-down, being merely a one-to-one transformer. Combining tube 51 has two separate electron discharge paths comprising respective intercoupled anodes 54, 55, respective intercoupled cathodes 56, 57 and respective control grids 58, 59. The cathodes 56, 57 are connected to ground through the self-biasing resistor 61 by-passed by a condenser 62. Grid 59 is connected to the high potential terminal of secondary winding 53 of transformer 52 whose other terminal is grounded. The control grid 58 is connected to the junction of resistors 17 and 18. It will be seen that by this arrangement the current through the electron discharge path 56—54 will correspond to the potential of control grid 54 which corresponds to terminal *d* of Figure 1. The current through the other discharge path 57—55 will correspond to the voltage across inductance 21 representing terminal *f* of Figure 1 with reversed polarity because of the transformer 52. The sum of these two currents which appears in the output lead 63 connected to both anodes 54 and 55 will then represent the difference between the voltages *d—e* and *f—e* of Figure 1, which as shown in Figure 5, is the desired output voltage *d—f*.

Figure 9A:
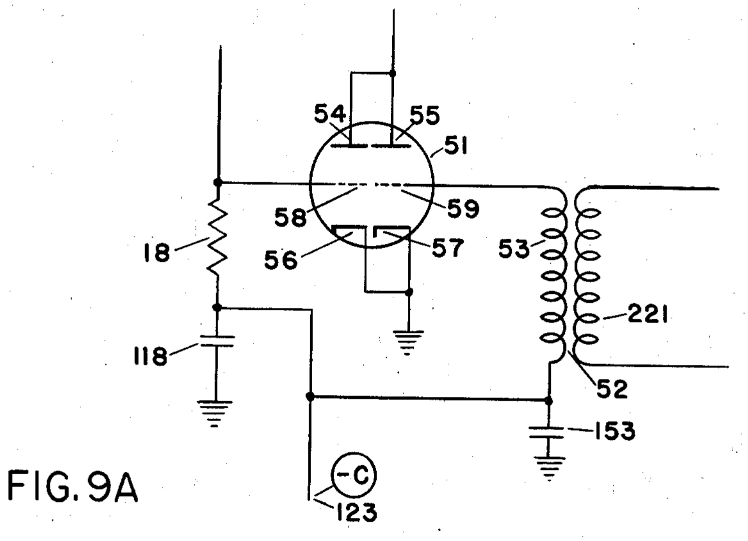

This output circuit 63 preferably contains a parallel tuned circuit 64 coupled to the output circuit 13, and thence to the plate supply 23. Circuit 64 is usually tuned to the same frequency as the carrier provided by source 11. However, by suitably biasing tube 51 to operate in a non-linear portion of its characteristic, as illustrated in Figure 9A, tube 51 may operate also as a frequency multiplier and circuit 64 will then be tuned to some harmonic of the carrier frequency such as a second or third harmonic thereof. Figure 9A shows only a fragment of the system of Figure 9, wherein resistor 18 and secondary 53 are grounded for signal currents through condensers 118 and 153, and are also connected to a bias source 123 of the proper value for producing the desired frequency multiplication.

Figure 10 shows a further modification of the circuit of Figure 9 which eliminates the transformer 52. In this case the combining tube 51 no longer has its cathodes 56 and 57 directly interconnected, but rather a radio frequency choke coil 71 is connected therebetween. Cathode 57 is now coupled through a coupling and blocking condenser 72 to the junction between inductance 21 and coupling condenser 22.

The other portions of the circuit of Figure 10 are similar to those in Figure 9 and the system will operate in the same manner, it being understood that by coupling the cathode 57 to the inductance 21 instead of the control grid 59 which is now grounded at 73, the same polarity reversal is obtained as was discussed relative to Figure 9, so that the circuit will operate in the same manner. It will be understood that the required polarity reversal is only relative, so that the connections of grid 59 and cathode 57 can be interchanged, provided the connections of grid 58 and cathode 56 are simultaneously interchanged. It will be understood in Figure 10 also the tube 51 may be made to operate as a frequency multiplier in the same manner as discussed relative to Figure 9.

Figures 9 and 10 also illustrate a method of compensating for any undesired effect due to the input capacitance of tube 51 which is especially effective with respect to the discharge path 56—54. Thus as shown in dotted lines in Figure 9, an input capacitance 81 may exist between the grid 58 and ground. Since this capacitance is effectively in parallel with the resistor 18 it may prevent the voltages across the two resistors 17 and 18 from being identical in both phase and amplitude. Accordingly a compensating condenser 82 is connected across resistor 17 as shown in Figure 9, so that the impedance of resistor 17 in conjunction with condenser 82 is identically the same as the impedance of resistor 18 in conjunction with the tube input capacitance 81, whereby balance is retained. The same balancing condenser 82 is shown in Figure 10 and operates similarly in that circuit.

It will be understood that in place of double triode 51, I may use two separate tubes or other double tubes, which may be triodes, tetrodes, pentodes, etc., as desired.

Accordingly the present invention provides a simple and practical phase modulator circuit which is inexpensive in construction and highly effective in operation to produce wide swing linear phase modulation in a single stage which may be combined with frequency multiplication without extra tubes where desired.

While the present invention has been illustrated in detail in connection with the above described embodiments thereof, it is to be understood that this description is illustrative only. Many modifications of these embodiments will be apparent to those skilled in the art, and it is to be understood that the present invention is not to be considered limited by the above description, but only as defined in the appended claims.

What is claimed is:

1. A phase modulator apparatus comprising a source of carrier wave having a grounded terminal, two circuits connected across said source, one of said circuits consisting of a pair of identical impedance elements series connected at a junction point, the other of said circuits consisting of a substantially pure resistance connected in series with a substantially pure reactance at a second junction point, said reactance including an inductance element variable in correspondence with a modulation signal and grounded at one terminal with respect to alternating currents and output means comprising a first electron discharge path including a pair of principal electrodes and a control grid, said control grid and one of said principal electrodes being connected between said first junction point and the grounded outer terminal of one of said impedance elements, a second electron discharge path comprising a pair of principal electrodes and a control electrode, means for impressing between said second control electrode and one of said latter principal electrodes the voltage across said inductance element but with reversed polarity, and an output circuit coupled to both said discharge paths to be excited by the sum of the currents therein, whereby said output circuit produces said carrier wave phase-modulated by said modulation signal.

2. Phase modulator apparatus as in claim 1 wherein said second discharge path voltage-impressing means comprises a secondary winding inductively coupled to said inductance element to produce a voltage equal and opposite to that of said inductance element, and means connecting said secondary winding between said second control grid and said last-named principal electrode.

3. Phase modulator apparatus as in claim 1 further comprising means for biasing both said control grids relative to their respective principal electrodes to a non-linear portion of their characteristics, whereby frequency multiplication is produced, said output circuit comprising a circuit tuned to a harmonic of said carrier frequency.

4. Phase modulator apparatus as in claim 1 wherein said first control electrode is coupled to the high potential point of said one impedance element and said first named principal electrode is coupled to the low potential end of said one impedance element, said second control electrode being connected to the low potential end of said inductance element and its corresponding principal electrode being coupled to the high potential end of said inductance element.

5. Phase modulator apparatus comprising a source of constant frequency carrier wave, a pair of circuits connected across the source, one of said circuits comprising a pair of series-connected identical impedances, the other of said circuits comprising a series connection of a substantially pure resistance and a substantially pure reactance, said reactance including an inductance means variable in correspondence with a modulation signal, a pair of electron discharge paths each defined by a cathode and an anode and having a control grid interposed therebetween, means impressing the voltage across said inductance, means between one of said control grids and its corresponding cathode, means impressing the voltage across one of said impedance elements between the other of said control grids and its corresponding cathode but with opposite polarity of connection, means combining the currents of said two paths into a single output connection, and an output circuit coupled to said output connection.

6. Phase modulator apparatus as in claim 5 wherein both said control grids are biased to a non-linear point of their characteristics, and said output circuit is tuned to a harmonic of said carrier wave whereby the phase modulated output of said apparatus is simultaneously frequency multiplied.

7. Phase modulator apparatus comprising a source of constant frequency carrier wave, means for obtaining a voltage equal to half the voltage of said source, a series connection of a substantially pure resistance and a substantially pure reactance across said source, said reactance being variable in correspondence with a modulation signal, means for producing a current corresponding to said source half voltage, means for producing a current corresponding to the voltage across said reactance, and means for combining said currents with a polarity reversal for one of said currents, said last means including a resonant tank circuit wherein is produced a phase modulated output signal.

8. Phase modulator apparatus as in claim 7 wherein said combining means is adapted simultaneously to frequency multiply said currents, said output circuit being tuned to a multiple of said carrier frequency.

ARTHUR SCHLANG.

REFERENCES CITED

The following references are of record in the file of this patent:

UNITED STATES PATENTS

| Number | Name | Date |
|---|---|---|
| 1,950,406 | Hoorn | Mar. 13, 1934 |
| 2,397,992 | Stodola | Apr. 9, 1946 |
| 2,430,126 | Korman | Nov. 4, 1947 |